United States Patent
Yu et al.

(10) Patent No.: US 10,175,950 B2
(45) Date of Patent: Jan. 8, 2019

(54) MONTGOMERY MODULAR MULTIPLICATION DEVICE AND EMBEDDED SECURITY CHIP WITH SAME

(71) Applicant: SHENZHEN STATE MICRO TECHNOLOGY CO., LTD., Shenzhen, Guangdong (CN)

(72) Inventors: Songliang Yu, Guangdong (CN); Jinqiang Chen, Guangdong (CN); Hao Xu, Guangdong (CN)

(73) Assignee: SHENZHEN STATE MICRO TECHNOLOGY CO., LTD., Shenzhen, Guangdong (CN)

( * ) Notice: Subject to any disclaimer, the term of this patent is extended or adjusted under 35 U.S.C. 154(b) by 186 days.

(21) Appl. No.: 15/275,580

(22) Filed: Sep. 26, 2016

(65) Prior Publication Data

US 2017/0010867 A1    Jan. 12, 2017

Related U.S. Application Data

(63) Continuation of application No. PCT/CN2015/083095, filed on Jul. 1, 2015.

(30) Foreign Application Priority Data

Apr. 15, 2015    (CN) .......................... 2015 1 0179155

(51) Int. Cl.
*H04L 9/00* (2006.01)
*G06F 7/72* (2006.01)
*H04L 9/06* (2006.01)

(52) U.S. Cl.
CPC ................ *G06F 7/728* (2013.01); *H04L 9/06* (2013.01)

(58) Field of Classification Search
CPC .......... G06F 7/723; G06F 7/724; G06F 7/725; G06F 7/726; G06F 7/727; G06F 7/728; H04L 9/00; H04L 9/06
See application file for complete search history.

(56) References Cited

U.S. PATENT DOCUMENTS

| | | | | |
|---|---|---|---|---|
| 6,209,016 B1 * | 3/2001 | Hobson | ................... | G06F 7/722 708/491 |
| 6,914,983 B2 * | 7/2005 | Chen | ....................... | G06F 7/722 380/28 |

(Continued)

FOREIGN PATENT DOCUMENTS

| CN | 103761068 A | 4/2014 |
|---|---|---|
| CN | 103780381 A | 5/2014 |
| CN | 103888246 A | 6/2014 |

OTHER PUBLICATIONS

State Intellectual Property Office of the P.R. China (ISR/CN), "International Search Report for PCT/CN2015/083095", China, dated Jan. 18, 2016.

*Primary Examiner* — Jeffrey C Pwu
*Assistant Examiner* — Helai Salehi
(74) *Attorney, Agent, or Firm* — Locke Lord LLP; Tim Tingkang Xia, Esq.

(57) ABSTRACT

A Montgomery modular multiplication device and an embedded security chip. The Montgomery modular multiplication device includes a first Montgomery modular multiplication module, a power calculation module and a second Montgomery modular multiplication module. The first Montgomery modular multiplication module obtains a first operation result A according to two first preset parameters. The power calculation module obtains a second operation result B according to the first operation result A output by the first Montgomery modular multiplication module, the first preset parameters, the second preset parameter and a power (Continued)

calculation function. The first Montgomery modular multiplication module further obtains a Montgomery modular multiplication conversion coefficient according to the first operation result A and the second operation result B. The second Montgomery modular multiplication module obtains a final modular multiplication result according to a first input parameter NA, a second input parameter NB and the Montgomery modular multiplication conversion coefficient.

8 Claims, 5 Drawing Sheets

(56) References Cited

U.S. PATENT DOCUMENTS

| | | | |
|---|---|---|---|
| 7,027,597 B1 * | 4/2006 | Stojancic | G06F 7/728 380/28 |
| 7,174,015 B1 | 2/2007 | Koc et al. | |
| 8,719,324 B1 | 5/2014 | Koc et al. | |
| 2002/0110240 A1 * | 8/2002 | Chen | G06F 7/722 380/28 |
| 2010/0177887 A1 * | 7/2010 | Ciet | G06F 7/728 380/28 |

* cited by examiner

MONTGOMERY MODULAR MULTIPLICATION DEVICE AND EMBEDDED SECURITY CHIP WITH SAME

CROSS-REFERENCE TO RELATED APPLICATIONS

This application is a continuation of International Patent Application No. PCT/CN2015/083095, with an international filing date of Jul. 1, 2015, designating the United States, now pending, which is based on Chinese Patent Application No. 201510179155.0, filed Apr. 15, 2015. The entire contents of these specifications are incorporated herein by reference.

TECHNICAL FIELD

The present invention relates to the field of the asymmetric key algorithm in cryptology, in particular to a Montgomery modular multiplication device and an embedded security chip with the same.

BACKGROUND ART

The security guarantee of information security is based on a security algorithm which is a class of asymmetric key algorithm. The basic operation of the asymmetric key algorithm is large modular multiplication, and the Montgomery modular multiplication algorithm in the modular multiplication algorithms is high in efficiency and easy to realize. An ordinary number needs to be converted into a Montgomery number and then subjected to Montgomery modular multiplication in a process of using Montgomery modular multiplication, however, it is necessary to use a conversion coefficient in the process of converting the Montgomery number, wherein the conversion coefficient is obtained by calculation generally via a large modular power multiplication algorithm, such that complex large operations are needed in the existing embedded security chip, thus needing longer operating time and more resources in the embedded security chip.

SUMMARY OF THE INVENTION

The present invention aims to solve the defects of the prior art, and provides a Montgomery modular multiplication device and an embedded security chip with the same.

The present invention provides a Montgomery modular multiplication device which comprises:

a first storage module which is used for storing two first preset parameters and a second preset parameter, wherein the first preset parameter is a constant 1, the second preset parameter is W−4 (W=φ(N), wherein y is an euler function and N is a modulus in Montgomery modular multiplication), and the second preset parameter is only related to the modulus N;

a first Montgomery modular multiplication module which is used for obtaining a first operation result A according to two first preset parameters;

a power calculation module which is used for obtaining a second operation result B according to the first operation result A output by the first Montgomery modular multiplication module, the first preset parameters, the second preset parameter and a power calculation function, wherein the power calculation function is a power function for calculating a number $R^{-1}$, and R and $R^{-1}$ are reciprocal relative to the modulus N;

the first Montgomery modular multiplication module is further used for obtaining a Montgomery modular multiplication conversion coefficient according to the first operation result A and the second operation result B;

a second storage module which is used for storing the first operation result A, the Montgomery modular multiplication conversion coefficient, the first input parameter NA and the second input parameter NB; and a second Montgomery modular multiplication module which is used for obtaining a final modular multiplication result according to the first input parameter NA, the second input parameter NB and the Montgomery modular multiplication conversion coefficient.

The present invention further provides an embedded security chip which comprises: the above-mentioned Montgomery modular multiplication device.

As can be seen from the above-mentioned solution, the power calculation module is only related to the Montgomery modular multiplication module, i.e., the conversion coefficient of Montgomery modular multiplication can be obtained just by calling Montgomery modular multiplication modules of different powers of modulus N, such that conversion coefficient calculation through a large modular power multiplication mode can be avoided, the coefficient does not need to be calculated in advance, and the memory space can be saved.

DETAILED DESCRIPTIONS OF THE PREFERRED EMBODIMENTS

In order to make the purpose, the technical solution and the advantages of the present invention more clearly, the present invention is further illustrated in details below in conjunction with the drawings and the embodiments. It should be understood that, the specific embodiments described herein are merely used to illustrate the present invention, rather than limiting the present invention.

In the prior art, an asymmetry key encryption method is used in an embedded security chip, and a Montgomery modular multiplication device is used in the method. An ordinary number needs to be converted into a Montgomery number in a process of using the Montgomery modular multiplication device, and it is necessary to use a conversion coefficient in the conversion process, wherein the conversion coefficient is obtained by calculation generally via a larger modular power multiplication algorithm. By means of the Montgomery modular multiplication device provided by the present invention, the conversion coefficient may be calculated just by using a Montgomery modular multiplication function itself, that is, the conversion coefficient is obtained by using the Montgomery modular multiplication function to calculate multiple times. Because conversion coefficient calculation through a large modular power multiplication mode can be avoided, the time required for key conversion is greatly saved, and therefore, the conversion coefficient does not need to be calculated in advance, and the memory space can be saved.

Figure 1:
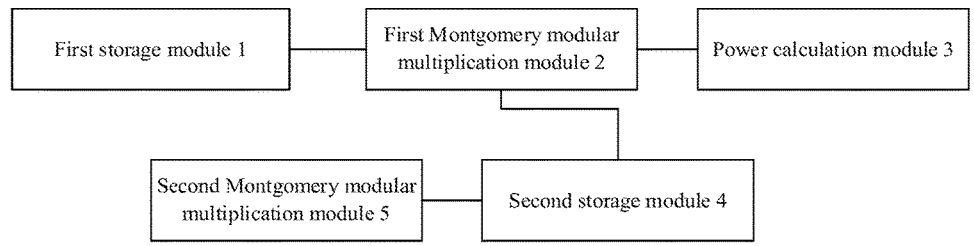
FIG. 1 is a structural schematic diagram of the Montgomery modular multiplication device of the present invention.

FIG. 1 is one embodiment of the present invention. The Montgomery modular multiplication device 10 comprises:

a first storage module 1 which is used for storing two first preset parameters and a second preset parameter, wherein the first preset parameter is a constant 1, the second preset parameter is W−4 (W=φ(N), wherein φ is an euler function and N is a modulus in Montgomery modular multiplication), and the second preset parameter is only related to the modulus N;

a first Montgomery modular multiplication module 2 which is used for obtaining a first operation result A according to two first preset parameters;

a power calculation module 3 which is used for obtaining a second operation result B according to the first operation result A output by the first Montgomery modular multiplication module 2, the first preset parameters, the second preset parameter and a power calculation function, wherein the power calculation function is a power function for calculating a number $R^{-1}$, and R and $R^{-1}$ are reciprocal relative to the modulus N;

the first Montgomery modular multiplication module 2 is further used for obtaining a Montgomery modular multiplication conversion coefficient according to the first operation result A and the second operation result B;

a second storage module 4 which is used for storing the first operation result A, the Montgomery modular multiplication conversion coefficient, the first input parameter NA and the second input parameter NB; and a second Montgomery modular multiplication module 5 which is used for obtaining a final modular multiplication result according to the first input parameter NA, the second input parameter NB and the Montgomery modular multiplication conversion coefficient.

In specific implementation, $R=2^n$, wherein n is a modular bit length of Montgomery modular multiplication, which may be 192, 239, 521, 1024, or 2048 generally.

In specific implementation, functions of the Montgomery modular multiplication function are realized in the first Montgomery modular multiplication module 2 and the second Montgomery modular multiplication module 5, that is to say, the first Montgomery modular multiplication module 2 and the second Montgomery modular multiplication module 5 may realize the following functions: $MontF(X,Y)=X*Y*R^{-1}$ MOD N, wherein X represents an input parameter input to the first Montgomery modular multiplication module 2 or the second Montgomery modular multiplication module 5, and Y represents another input parameter input to the first Montgomery modular multiplication module 2 or the second Montgomery modular multiplication module 5. In the specific implementation process, the modulus N of the first Montgomery modular multiplication module 2 and the modulus N of the second Montgomery modular multiplication module 5 are the same. However, the power calculation module 3 realizes the functions of a power calculation function CoeffEx.

Specifically, when R is equal to $2^n$, the Montgomery modular multiplication device realizes the following functions: acquiring two first preset parameters and a second preset parameter, wherein the first preset parameter is constant 1; obtaining a first operation result A according to the two first preset parameters and a Montgomery modular multiplication function, wherein the first operation result $A=MontF(1,1)=2^{-n}$, and $2^{-n}=2^{n(w-1)}$ may be obtained by Fermat Theory; obtaining a second operation result B according to the first operation result A, the first preset parameters, the second preset parameter and a power calculation function, wherein the second preset parameter is W−4 (W=φ(N), wherein φ is an euler function and N is a modulus in Montgomery modular multiplication), the second preset parameter is only related to the modulus N, and the power calculation function CoeffEx is a power function for calculating a number $R^{-1}$, the second operation result $B=CoeffEx(A,W-4)=2^{-n(w-4)}$, and R and $R^{-1}$ are reciprocal relative to the modulus N; obtaining a Montgomery modular multiplication conversion coefficient D ($D=MontF(A,B)=2^{n(w-1)}*2^{-n(w-4)}*2^{-n}=2^{2n}$) according to the first operation result A, the second operation result B and the Montgomery modular multiplication function, and because of $R=2^n$, the conversion coefficient $D=R^2$; and next obtaining a final modular multiplication result RE according to the first input parameter NA, the second input parameter NB, the Montgomery modular multiplication conversion coefficient and the Montgomery modular multiplication function, wherein RE is a modular multiplication result of the first input parameter NA and the second input parameter NB relative to the modulus N.

As can be seen from the above-mentioned solution of the device, the power calculation module 3 is only related to the Montgomery modular multiplication module, the conversion coefficient of Montgomery modular multiplication can be obtained just by calling Montgomery modular multiplication modules of different powers of modulus N, i.e., calling the Montgomery modular multiplication function of the multi-power modulus N, such that conversion coefficient calculation through a large modular power multiplication mode can be avoided, the coefficient does not need to be calculated in advance, and the memory space can be saved. Moreover, the asymmetric key operation can also be finished on the basis of no complex large number library, and may be used for detecting whether a large number is a necessary condition of a prime number and detecting the correctness of the Montgomery modular multiplication algorithm. In addition, if the calculated number is longer and longer, the advantages of this algorithm will be more significant in case of multiple prime number domains.

Figure 2:
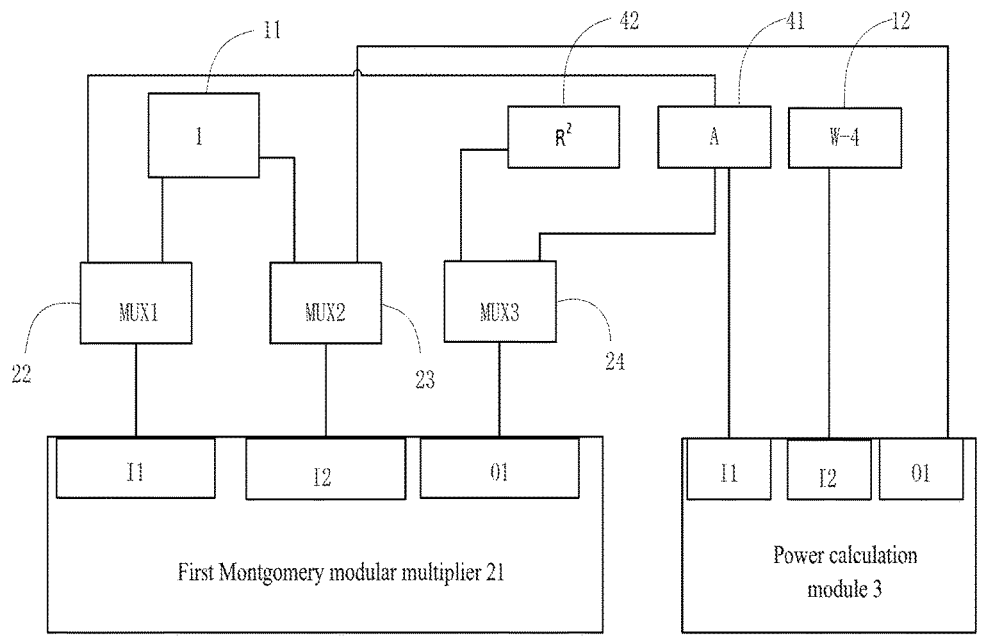
FIG. 2 is a schematic diagram when the first Montgomery modular multiplication module and the calculation module are connected.
Figure 3:
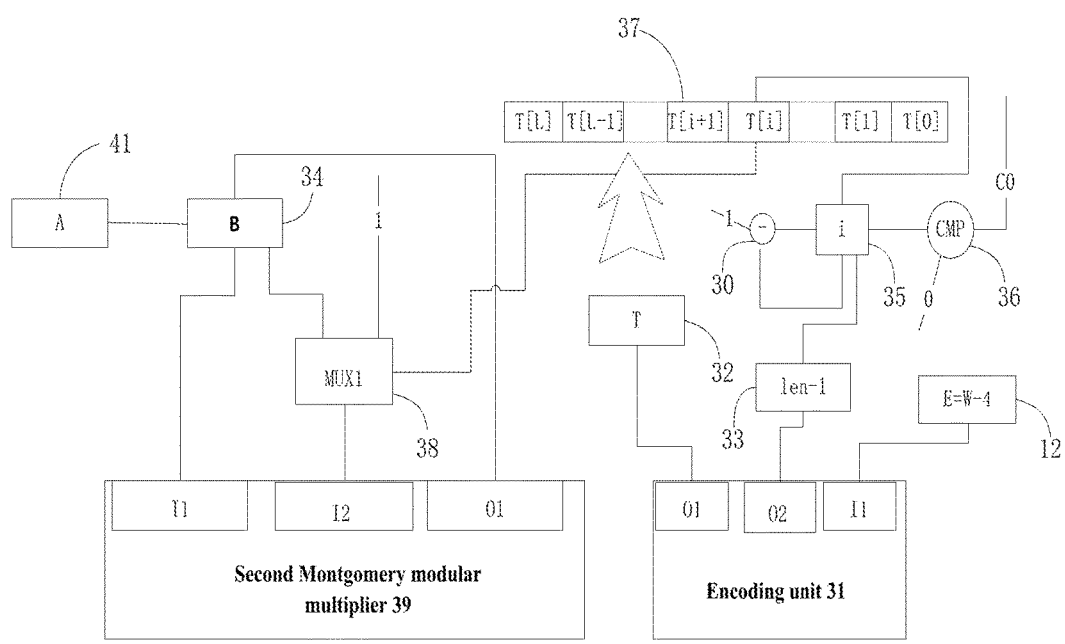
FIG. 3 is a structural schematic diagram of the power calculation module.

In specific implementation, as shown in FIG. 2 and FIG. 3, the first storage module 1 comprises a constant memory 11 and a first register 12. The constant memory 11 is used for storing two constants 1. The first register 12 is connected with an input end of the power calculation module 3 and is used for storing the second preset parameter W−4.

Figure 5:
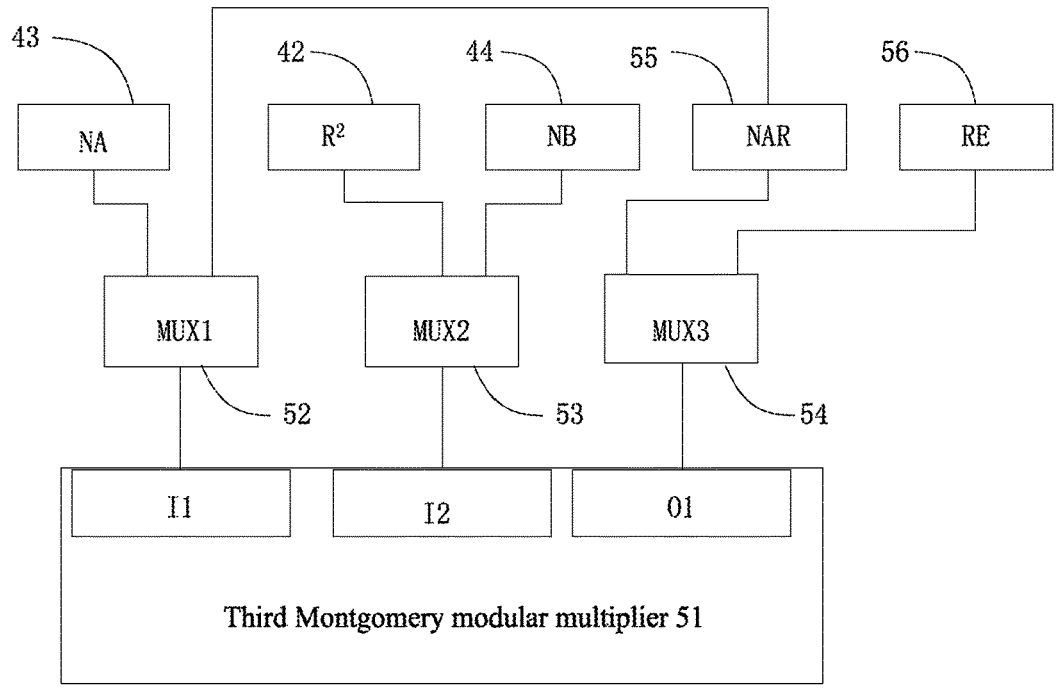
FIG. 5 is a schematic diagram of the first embodiment of the second Montgomery modular multiplication module.

As shown in FIG. 2 and FIG. 5, the second storage module 4 comprises a second register 41, a third register 42, a fourth register 43 and a fifth register 44.

The second register 41 is connected with the input end of the power calculation module 3 and an output end of the first Montgomery modular multiplication module 2 respectively and is used for storing the first operation result A, that is, the second register 41 is connected with the output end of the first Montgomery modular multiplication module 2 through a first signal demultiplexer 24.

The third register 42 is connected with the output end of the first Montgomery modular multiplication module 2 and is used for storing the Montgomery modular multiplication conversion coefficient D. As shown in FIG. 5, the third register 42 is connected with an input end of the third Montgomery modular multiplier 51 through a seventh multiplexer 53.

The fourth register 43 is connected with an input end of the second Montgomery modular multiplication module 5 and is used for storing the first input parameter NA. As shown in FIG. 5, the fourth register 43 is connected with an input end of the third Montgomery modular multiplier 51 through a sixth multiplexer 52.

The fifth register 44 is connected with an input end of the second Montgomery modular multiplication module 5 and is used for storing the second input parameter NB. As shown in FIG. 5, the fifth register 44 is connected with the input end of the third Montgomery modular multiplier 51 through a seventh multiplexer 53.

As shown in FIG. 2, the first Montgomery modular multiplication module 2 comprises a first Montgomery modular multiplier 21, a first multiplexer 22, a second multiplexer 23 and a first signal demultiplexer 24, wherein: the first multiplexer 22 is connected with the constant memory 11, the second register 41 and the input end of the first Montgomery modular multiplier module 21 respectively, the second multiplexer 23 is connected with the constant memory 11, an output end of the power calculation module 3 and the input end of the first Montgomery modular multiplier module 21 respectively, and the first signal demultiplexer 24 is connected with the second register 41, the third register 42 and the output end of the first Montgomery modular multiplier 21 respectively, that is to say, the first Montgomery modular multiplier 21 obtains a first operation result A according to the two first preset parameters and then obtains a Montgomery modular multiplication conversion coefficient D according to the first operation result A and the second operation result B.

In specific implementation, as shown in FIG. 3, the power calculation module 3 comprises an encoding unit 31, a sixth register 32, a seventh register 33, an eighth register 34, a ninth register 35, a first comparator 36, a first selector 37, a third multiplexer 38, a second Montgomery modular multiplier 39 and a first subtractor 30.

The encoding unit 31 is used for converting the second preset parameter W−4 into a code of a calculation process to obtain an operation designation number T and a bit length len thereof, wherein an input end of the encoding unit 31 is connected with the first register 12, and wherein the first register 12 is used for storing the second preset parameter W−4.

The sixth register 32 is used for storing an operation designation number T, wherein the sixth register 32 is connected with the output end of the encoding unit 31 and the first selector 37 respectively.

The seventh register 33 is used for storing the bit length len-1 of the operation designation number T, wherein the seventh register 33 is connected with the ninth register 35 and the output end of the encoding unit 31 respectively.

The eighth register 34 is used for assigning the first operation result A to an intermediate result S and storing the intermediate result S, and outputting the second operation result B when a cyclic variable i is less than zero, wherein the second operation result B is equal to the intermediate result S, and wherein the eighth register 34 is connected with the second register 41, the input end of the second Montgomery modular multiplier 39 and the third multiplexer 38 respectively.

The ninth register 35 is used for initializing the cyclic variable i and assigning len-1 to the cyclic variable i, wherein the ninth register 35 is connected with the first subtractor 30 and the first comparator 36 respectively.

The first comparator 36 is used for judging whether the cyclic variable i is greater than or equal to zero, and sending an operation state signal C0 as an ending signal when the cyclic variable i is less than zero.

The first selector 37 is used for acquiring a value of an operation designation number T [i] according to the cyclic variable i when the cyclic variable i is greater than or equal to zero, and outputting the value to the third multiplexer 38.

The third multiplexer 38 is used for connecting the intermediate result S and the first preset parameter, outputting the intermediate result S and the first preset parameter to the second Montgomery modular multiplier 39 when the value of the operation designation number T [i] does not satisfy logic truth, and outputting the two intermediate results S to the second Montgomery modular multiplier 39 when the value of the operation designation number T [i] satisfies logic truth, wherein the third multiplexer 38 is connected with the first selector 37, the constant storage 11 and the second Montgomery modular multiplier 39 respectively.

The second Montgomery modular multiplier 39 is used for updating the intermediate result S according to the intermediate result S and the first preset parameter, or updating the intermediate result S according to the two intermediate results S, wherein an input end of the second Montgomery modular multiplier 39 is connected with the eighth register 34 and the third multiplexer 38 respectively, and an output end of the second Montgomery modular multiplier 39 is connected with the eighth register 34.

The first subtractor 30 is used for auto-decreasing a constant 1 from the value of the cyclic variable i after the intermediate result S is updated, and writing a result of auto-decreasing the constant 1 from the value of the cyclic variable i into the ninth register 35, wherein the subtractor 30 is connected with the ninth register 35, and the ninth register 35 is connected with the first comparator 36.

In specific implementation, the power calculation module 3 specifically realizes the following functions: converting the second preset parameter W−4 into a code of a calculation process to obtain an operation designation number T and a bit length len thereof; assigning the first operation result A to the intermediate result S, i.e., $S=A=2^{-n}$, and then value A is equal to the number $R^{-1}$; and initializing the cyclic variable i and assigning len-1 to the cyclic variable i, i.e., i=len-1, Next, judging whether the cyclic variable i is greater than or equal to zero; outputting the second operation result B when the cyclic variable i is less than zero, wherein the second operation result B is equal to the intermediate result S, i.e., S is equal to $A^E$; judging whether the value of T[i] satisfies logic truth when the cyclic variable i is greater than or equal to zero, calculating to obtain a calculation result according to the intermediate result S, the first preset parameter and the Montgomery modular multiplication function when the value of T[i] does not satisfy logic truth, and updating the intermediate result S according to the calculation result, i.e., S=MontF(S,1); calculating to obtain a calculation result according to the two intermediate results S and the Montgomery modular multiplication function when the value of T[i] satisfies logic truth, and updating the intermediate result S according to the calculation result, i.e., S=MontF(S,S); and after the intermediate result S is updated, auto-decreasing a constant 1 from the cyclic variable i, i.e., and next, judging whether the cyclic variable i is greater than or equal to zero.

Moreover, the code of the calculation process may also be interpreted as calling a CaclStepEncode function once, that is, inputting the second preset parameter W−4=E, outputting the operation designation number T and the data bit length len thereof, storing the calculated result and returning the operation designation number T and the data bit length len=CaclStepEncode(E,T) thereof, wherein the second preset parameter E is the times of calculation, i.e., the number of the power of calculation, the value of E is less than N, and the bit length of the operation designation number T may not exceed the two times of the bit length of E. T is an array, T[i] is an element in the array, the value of T[i] only may be 0 or non-zero, and therefore, it is knowable that the power calculation function CoeffEx is used for calculating the E power of the number $R^{-1}$.

Figure 4:
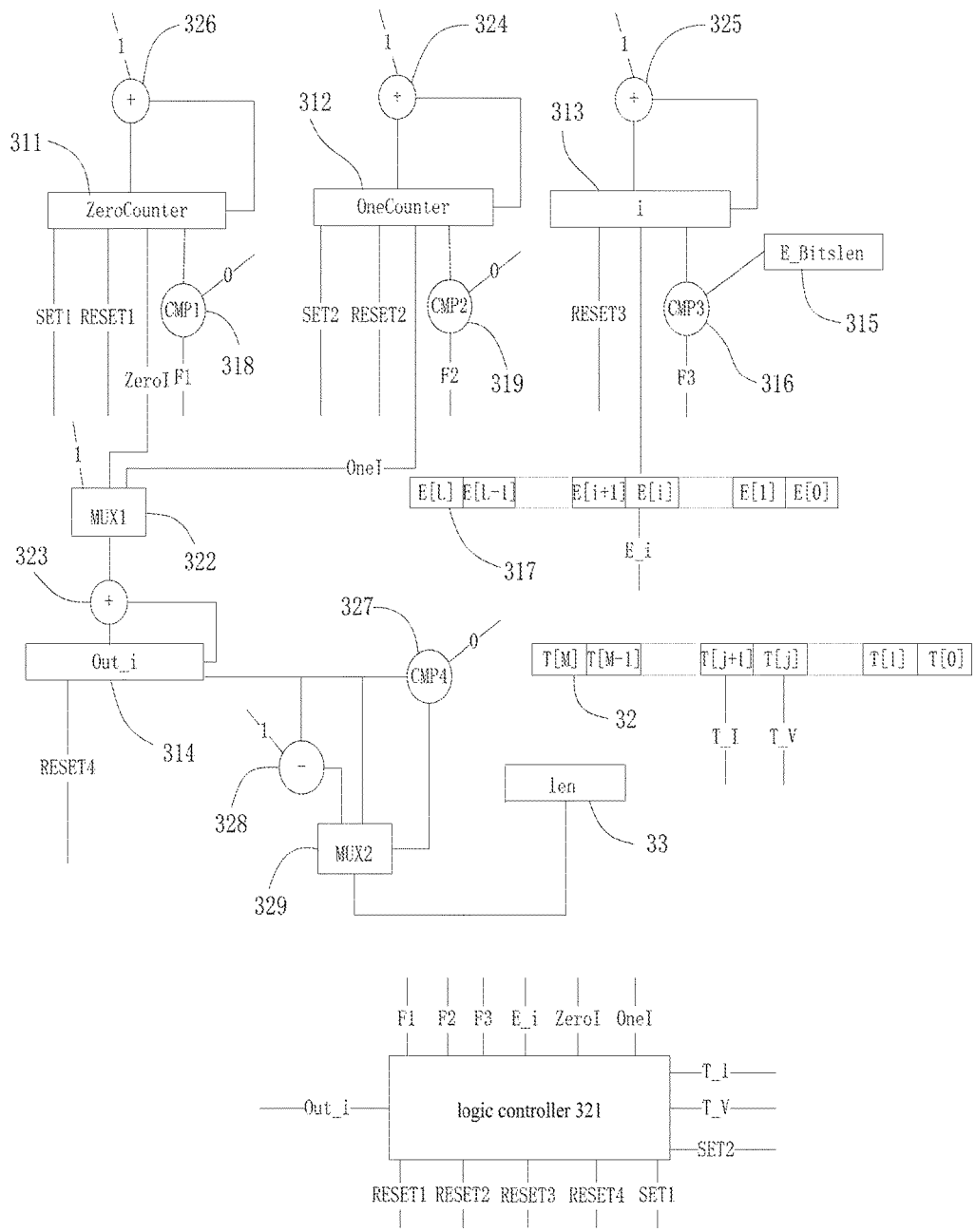
FIG. 4 is a structural schematic diagram of an encoding unit in FIG. 3.

In specific implementation, as shown in FIG. 4, the encoding unit 31 comprises a tenth register 311, an eleventh register 312, a twelfth register 313, a thirteenth register 314, a fourteenth register 315, a second comparator 316, a third comparator 318, a fourth comparator 319, a fifth comparator 327, a logic controller 321, a fourth multiplexer 322, a first adder 323, a second adder 324, a third adder 325, a fourth adder 326, a second selector 317, a second subtractor 328 and a fifth multiplexer 329.

The tenth register 311 is used for storing a first variable ZeroCounter and initializing the first variable ZeroCounter to zero according to a signal RESET1 sent from the logic controller 321, wherein the tenth register 311 is connected with the fourth adder 326, the third comparator 318, the fourth multiplexer 322 and the logic controller 321 respectively.

The eleventh register 312 is used for storing a second variable OneCounter and initializing the second variable OneCounter to zero according to a signal RESET2 sent from the logic controller 321, wherein the eleventh register 312 is connected with the second adder 324, the fourth comparator 319, the fourth multiplexer 322 and the logic controller 321 respectively.

The twelfth register 313 is used for storing a cyclic variable i and initializing the cyclic variable i according to an initializing signal RESET3 of the logic controller 321, wherein the twelfth register 313 is connected with the third adder 325, the second comparator 316, the second selector 317 and the logic controller 321 respectively.

The thirteenth register 314 is used for storing a third variable Out_i and initializing the third variable Out_i according to an initializing signal RESET4 of the logic controller 321, wherein the thirteenth register 314 is connected with the first adder 323, the fifth comparator 327, the second subtractor 328 and the logic controller 321.

The fourteenth register 315 is used for storing a value of E_Bitslen, wherein the E_Bitslen is a bit length of the second preset parameter, and the fourteenth register 315 is connected with the second comparator 316.

The second comparator 316 is used for judging whether the cyclic variable i is less than or equal to E_Bitslen, and outputting a second judging result F3 to the logic controller 321.

The third comparator 318 is used for judging whether the first variable ZeroCounter is equal to zero and outputting a third judging result F1 to the logic controller 321.

The fourth comparator 319 is used for judging whether the second variable OneCounter is equal to zero and outputting a fourth judging result F2 to the logic controller 321.

The second selector 317 is used for acquiring a value of E[i] according to the cyclic variable i and outputting the value of E[i] to the logic controller 321.

The logic controller 321 is used for outputting the first control signal when the cyclic variable i is not less than or equal to E_Bitslen, and outputting at least one of a second group of control signals, a third group of control signals, a fourth group of control signals, a fifth group of control signals and a sixth control signal according to the value E_i of E[i], the third judging result F1 and the fourth judging result F2, wherein the second group of control signals, the third group of control signals, the fourth group of control signals and the fifth group of control signals are all include the sixth control signal.

The fourth multiplexer 322 is used for connecting the constant 1, the tenth register 311 and the eleventh register 312 respectively, outputting the constant 1 and the value ZeroI of ZeroCounter when receiving the third group of control signals and outputting the value OneI of OneCounter when receiving the fifth group of control signals.

The first adder 323 is used for auto-adding 1 to the third variable Out_i, calculating the third variable Out_i=Out_i+ZeroCounter, and outputting a calculation result to the thirteenth register 314, wherein the first adder 323 is connected with the fourth multiplexer 322.

The second adder 324 is used for auto-adding 1 to the second variable OneCounter when receiving the second group of control signals.

The third adder 325 is used for auto-adding 1 to the cyclic variable i when receiving the sixth control signal.

The second comparator 316 is further used for judging whether the cyclic variable i is less than or equal to E_Bitslen when the cyclic variable i is auto-added by 1, and outputting a second judging result F3 to the logic controller 321.

The sixth register 32 is further used for assigning zero to an operation designation number T[Out_i] and assigning 1 to an operation designation number T [Out_i:Out_i+ZeroCounter−1] when receiving the third group of control signals, and assigning 1 to an operation designation number T [Out_i:Out_i+ZeroCounter−1] when receiving the fifth group of control signals, wherein the sixth register 32 is connected with the logic controller 321.

The eleventh register 312 is further used for assigning 0 to the second variable OneCounter when receiving the fifth group of control signals.

The tenth register 311 is further used for assigning 1 to the first variable ZeroCounter when receiving the fifth group of control signals, and assigning 1 to the first variable ZeroCounter when receiving the third group of control signals.

The third adder 325 is further used for auto-adding 1 to the cyclic variable i when receiving the sixth control signal.

The fourth adder 326 is used for auto-adding 1 to the first variable ZeroCounter when receiving the fourth group of control signals.

The fifth comparator 327 is used for judging whether the third variable Out_i is greater than zero when receiving the first control signal.

The second subtractor 328 is used for auto-decreasing 1 from the third variable Out_i when the third variable Out_i is greater than zero.

The fifth multiplexer 329 is used for connecting the fifth comparator 327, the second subtractor 328 and the seventh register 33 respectively, outputting a result of auto-decreasing 1 from the third variable Out_i to the seventh register 33 when the third variable Out_i is greater than zero, and outputting the third variable Out_i to the seventh register 33 when the third variable Out_i is less than or equal to zero.

In specific implementation, the truth table of the logic controller 321 is as follows:

| E[i] | F1 | F2 | output control signal | remarks |
|---|---|---|---|---|
| 1 | 1 | 1 | second group of control signals | OneCounter += 1 |
| 1 | 1 | 0 | second group of control signals | OneCounter += 1 |
| 1 | 0 | 1 | third group of control signals | T[Out_i] = 0 . . . ZeroCounter = 1 |
| 1 | 0 | 0 | sixth control signal | i = i + 1 |
| 0 | 1 | 1 | fourth group of control signals | ZeroCounter += 1 |
| 0 | 1 | 0 | fifth group of control signals | T[Out_i . . . Out_i + OneCounter-1] = 1 . . . ZeroCounter = 1 |
| 0 | 0 | 1 | fourth group of control signals | ZeroCounter += 1 |
| 0 | 0 | 0 | sixth control signal | i = i + 1 |

Wherein the value of F1 is a comparative judgment result value of ZeroCounter and zero, and the value of F2 is a comparative judgment result value of OneCounter and zero. When ZeroCounter is equal to zero, F1 is 1, and when ZeroCounter is not equal to zero, F1 is 0; and when OneCounter is equal to zero, F2 is 1, and when OneCounter is not equal to zero, F2 is 0.

As shown in FIG. 4, a signal ZeroI is a current value of a ZeroCounter counter, and a signal OneI is a current value of a OneCounter counter. A signal SET1 sets the ZeroCounter counter as 1, and a signal SET2 sets the OneCounter counter as 1. An input signal F3 is obtained according to a comparison result of the cyclic variable i and E_Bitslen, an input signal E_i is obtained via the second selector 317 according to the cyclic variable i and the twelfth register 313, an input signal F1 is obtained according to a comparison result of ZeroCounter and zero, and an input signal F2 is obtained according to a comparison result of OneCounter and zero. Output signals T_I, T_V and SET1 all belong to the third group of control signals, and output signals T_I, T_V, RESET2 and SET1 all belong to the fifth group of control signals. The second group of control signals, the third group of control signals, the fourth group of control signals and the fifth group of control signals all include the sixth control signal.

In specific implementation, the encoding unit 31 realizes the following functions: initializing the first variable Zero-Counter, the second variable OneCounter, the cyclic variable i and the third variable Out i, i.e., ZeroCounter=0, OneCounter=0, i=0, Out i=0; judging whether the cyclic variable i is less than or equal to E_Bitslen, wherein E_Bitslen is a bit length of the second preset parameter W−4, i.e., a bit length of E; when the cyclic variable i is less than or equal to E_Bitslen, judging whether the value of E[i] satisfies logic truth; when the value of E[i] satisfies logic truth, judging whether the first variable ZeroCounter is equal to zero; when the first variable ZeroCounter is not equal to zero, judging whether the second variable OneCounter is equal to zero; when the second variable OneCounter is equal to zero, assigning zero to an operation designation number T [Out_i], auto-adding 1 to the third variable Out_i, assigning 1 to an operation designation number T [Out_i:Out_i+ZeroCounter-1], next enabling the third variable Out_i to be equal to Out_i+ZeroCounter, assigning 1 to the first variable ZeroCounter, i.e. T [Out_i]=0, Out_i=Out_i+1, T [Out_i: Out_i+ZeroCounter-1]=1, Out_i=Out_i+ZeroCounter, Zero-Counter=1, and proceeding to the step of auto-adding 1 to the cyclic variable i; auto-adding 1 to the cyclic variable i, i.e., i=i+1, and next proceeding to the step of judging whether the cyclic variable i is less than or equal to E_Bitslen; when the first variable ZeroCounter is equal to zero, auto-adding 1 to the second variable OneCounter, i.e., OneCounter=OneCounter+1, and next proceeding to the step of auto-adding 1 to the cyclic variable i; when the value of E[i] does not satisfy logic truth, judging whether the second variable OneCounter is equal to zero; when the second variable OneCounter is equal to zero, judging whether the first variable ZeroCounter is equal to zero, and if the first variable ZeroCounter is not equal to zero, proceeding to the step of auto-adding 1 to the cyclic variable i; when the first variable ZeroCounter is equal to zero, assigning 1 to an operation designation number T [Out_i: Out_i+ZeroCounter-1], enabling the third variable Out_i to be equal to Out_i+ZeroCounter, assigning zero to the second variable OneCounter and assigning 1 to the first variable ZeroCounter, i.e., T[Out_i: Out_i+ZeroCounter-1]=1, Out_i=Out_i+ZeroCounter, OneCounter=0, ZeroCounter=1, and proceeding to the step of auto-adding 1 to the cyclic variable i; when the second variable OneCounter is equal to zero, auto-adding 1 to the first variable ZeroCounter, i.e., ZeroCounter=ZeroCounter+1, and next proceeding to the step of auto-adding 1 to the cyclic variable i; when the cyclic variable i is less than or equal to E_Bitslen, judging whether the value of third variable Out_i is greater than zero; when the value of third variable Out_i is greater than zero, auto-decreasing 1 from the third variable Out_i, i.e., Out_i=Out_i−1; and next outputting a bit length len=Out i and an operation designation number T, and when the value of third variable Out_i is less than or equal to zero, directly outputting a bit length len=Out_i, and the operation designation number T. That is, the encoding unit 31 realizes that one number is converted into a code of a number in the calculation process, and for the encoded number, each bit of the number is subjected to traverse processing just by depending on resources of several timers without complicated calculation, thus facilitating hardware implementation. Next, the Montgomery modular multiplication conversion coefficient D is obtained by performing operation on the code of the number.

In specific implementation, after the Montgomery modular multiplication conversion coefficient D is obtained by calculation, it is necessary to execute four times of Montgomery modular multiplication via the existing ordinary modular multiplication to realize ordinary modular multiplication, while it is only necessary to execute two times of Montgomery modular multiplication in an improved mode to realize the ordinary modular multiplication, and therefore, the state of controlled operations in the improved mode is simplified twice.

As shown in FIG. 5, the second Montgomery modular multiplication module 5 comprises a third Montgomery modular multiplier 51, a sixth multiplexer 52, a seventh multiplexer 53, a third signal demultiplexer 54, a twentieth register 55 and a twenty-first register 56, wherein the sixth multiplexer 52 is connected with the fourth register 43, and the seventh multiplexer 53 is connected with the third register 42 and the fifth register 44 respectively.

An input end of the third Montgomery modular multiplier 51 is connected with the sixth multiplexer 52 and the seventh multiplexer 53 respectively, an output end of the third Montgomery modular multiplier 51 is connected with the third signal demultiplexer 54, and the third Montgomery modular multiplier 51 is used for obtaining a first modular multiplication result NAR according to the first input parameter NA and the Montgomery modular multiplication conversion coefficient.

The twentieth register 55 is connected with the third signal demultiplexer 54 and the sixth multiplexer 52 respectively and is used for storing a first modular multiplication result NAR.

The third Montgomery modular multiplier 51 is further used for obtaining a final power multiplication result according to the second input parameter NB and the first modular multiplication result NAR.

The twenty-first register 56 is connected with the third signal demultiplexer 54 and is used for storing the final modular multiplication result.

That is, the second Montgomery modular multiplication module 5 realizes the following functions: obtaining a first modular multiplication result NAR according to the first input parameter NA, the Montgomery modular multiplication conversion coefficient D and the Montgomery modular multiplication function; and obtaining a final modular multiplication result according to the second input parameter NB, the first modular multiplication result NAR and the Montgomery modular multiplication function. For first use of the third Montgomery modular multiplier 51, i.e., calling the Montgomery modular multiplication function once, two input parameters are NA and $R^2$ respectively, wherein $R^2$ is a Montgomery modular multiplication conversion coefficient, NAR=MontF(NA, R2), and NAR is a variable. For further use of the third Montgomery modular multiplier 51, i.e., calling the Montgomery modular multiplication function once, two input parameters are NAR and B respectively, wherein RE=MontF(NAR,B), and RE is a modular multiplication result of NA and NB relative to a modulus N.

Figure 6:
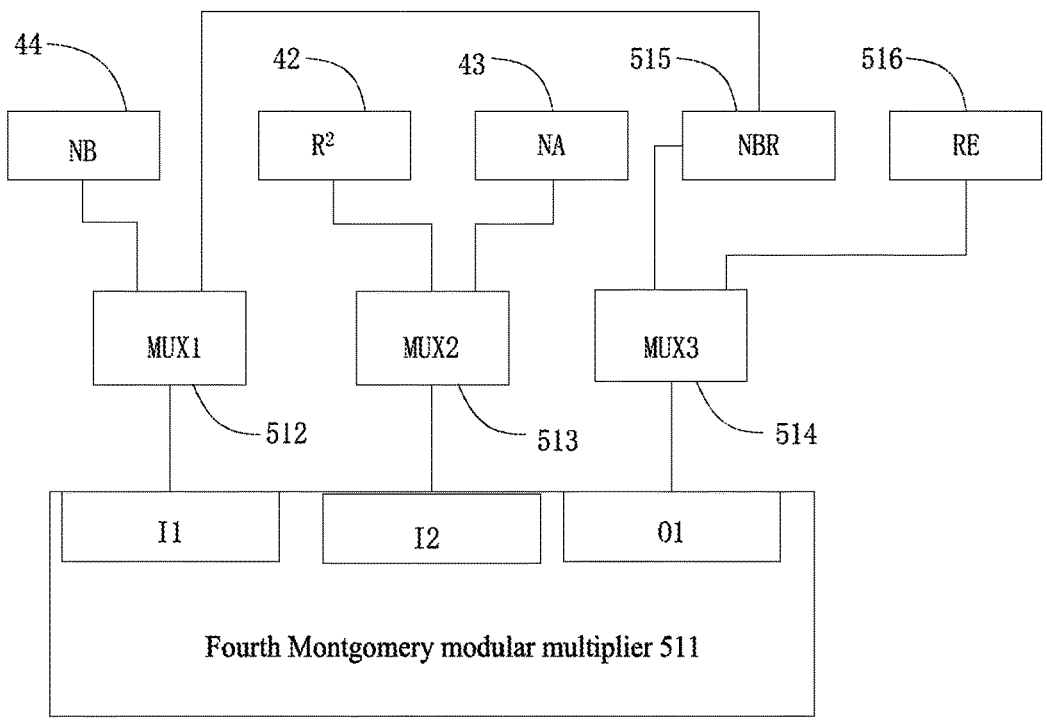
FIG. 6 is a schematic diagram of the second embodiment of the second Montgomery modular multiplication module.

As shown in FIG. 6, the second Montgomery modular multiplication module 5 comprises a fourth Montgomery modular multiplier 511, an eighth multiplexer 512, a ninth multiplexer 513, a fourth signal demultiplexer 514, a twenty-second register 515 and a twenty-third register 516, wherein the eighth multiplexer 512 is connected with the fifth register 44, and the ninth multiplexer 513 is connected with the fourth register 43 and the third register 42 respectively.

An input end of the fourth Montgomery modular multiplier 511 is connected with the eighth multiplexer 512 and the ninth multiplexer 513 respectively, an output end of the fourth Montgomery modular multiplier 511 is connected with the fourth demultiplexer 514, and the fourth Montgomery modular multiplier 511 is used for obtaining a second modular multiplication result NBR according to the second input parameter NB and the Montgomery modular multiplication conversion coefficient.

The twenty-second register 515 is connected with the fourth signal demultiplexer 514 and the eighth multiplexer 512 respectively and is used for storing the second modular multiplication result NBR.

The fourth Montgomery modular multiplier 511 is further used for obtaining the final modular multiplication result according to the first input parameter NA and the second modular multiplication result NBR. The twenty-third register 516 is connected with the fourth signal demultiplexer 514 and is used for storing the final module multiplication result.

That is, the second Montgomery modular multiplication module 5 realizes the following functions: obtaining a second modular multiplication result NBR according to the first input parameter NB, the Montgomery modular multiplication conversion coefficient D and the Montgomery modular multiplication function; and obtaining a final modular multiplication result according to the second input parameter NA, the second modular multiplication result NBR and the Montgomery modular multiplication function. That is, in case of calling the Montgomery modular multiplication function once, the two input parameters are NB and R2 respectively, wherein NBR=MontF(NB, R2), and BR is a variable. In case of calling the Montgomery modular multiplication function again, the two input parameters are NA and NBR respectively, wherein RE=MontF(NA, NBR), and RE is a modular multiplication result of NA and NB relative to the modulus N.

Figure 7:
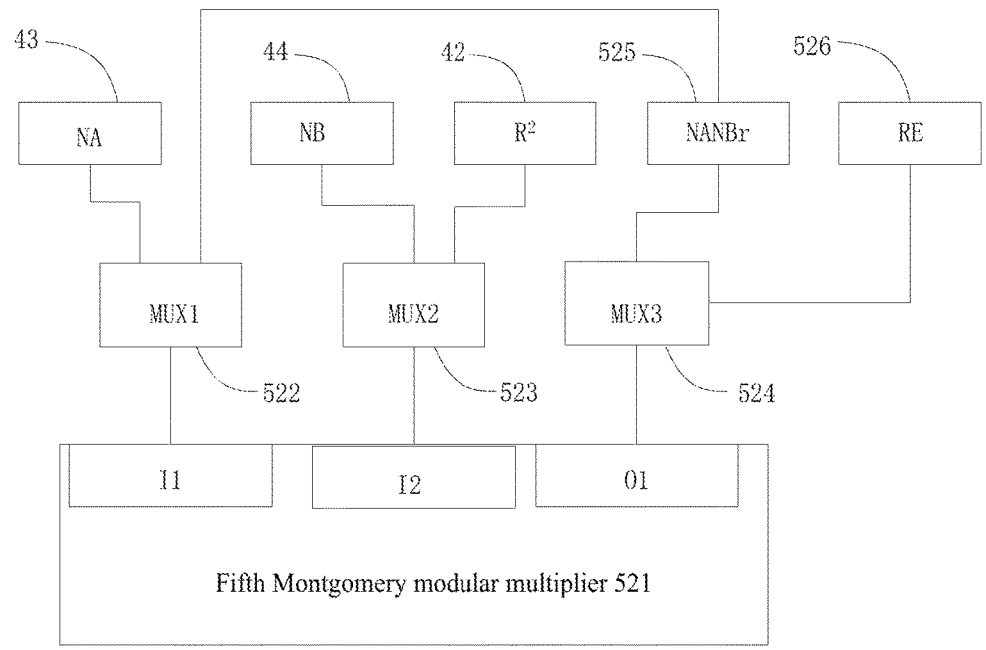
FIG. 7 is a schematic diagram of the third embodiment of the second Montgomery modular multiplication module.

As shown in FIG. 7, the second Montgomery modular multiplication module 5 comprises a fifth Montgomery modular multiplier 521, a tenth multiplexer 522, an eleventh multiplexer 523, a fifth signal demultiplexer 524, a twenty-fourth register 525 and a twenty-fifth register 526, wherein the tenth multiplexer 522 is connected with the fourth register 43, and the eleventh multiplexer 523 is connected with the third register 42 and the fifth register 44 respectively.

An input end of the fifth Montgomery modular multiplier 521 is connected with the tenth multiplexer 522 and the eleventh multiplexer 523 respectively, an output end of the fifth Montgomery modular multiplier 521 is connected with the fifth signal demultiplexer 524, and the fifth Montgomery modular multiplier 521 is used for obtaining a third modular multiplication result NARBr according to the first input parameter NA and the second input parameter NB.

The twenty-fifth register 526 is connected with the fifth signal demultiplexer 524 and is used for storing the third modular multiplication result NANBr.

The fifth Montgomery modular multiplier 521 is further used for obtaining a final modular multiplication result according to the Montgomery modular multiplication conversion coefficient and the third modular multiplication result NANBr.

The twenty-fourth register 525 is connected with the fifth signal demultiplexer 524 and is used for storing the final modular multiplication result.

That is, the second Montgomery modular multiplication module 5 realizes the following functions: obtaining a third modular multiplication result NANBr according to the first input parameter NA, the second input parameter NB and the Montgomery modular multiplication function; and obtaining a final modular multiplication result according to the third modular multiplication result NANBr, the Montgomery modular multiplication conversion coefficient and the Montgomery modular multiplication function. That is, in case of calling the Montgomery modular multiplication function once, the two input parameters are A and B respectively, wherein NANBr=MontF(NA, NB), and NANBr is a variable. In case of calling the Montgomery modular multiplication function again, the two input parameters are NANBr and $R^2$ respectively, wherein RE=MontF(NANBr, R2), and RE is a modular multiplication result of NA and NB relative to the modulus N.

Figure 8:
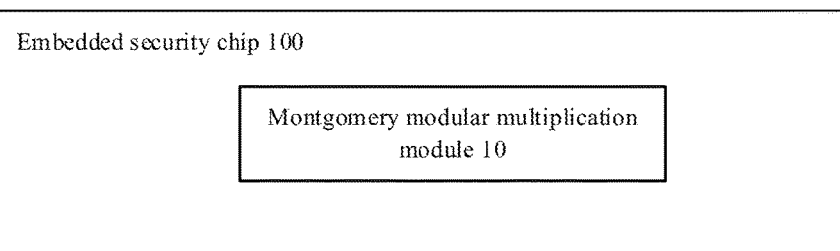
FIG. 8 is a schematic diagram of the embedded security chip of the present invention.

In specific implementation, the present invention further provides an embedded security chip of one embodiment, and as shown in FIG. 8, the embedded security chip 100 comprise the above-mentioned Montgomery modular multiplication device 10.

As can be seen from the above-mentioned solution of the chip, the power calculation module 3 is only related to the Montgomery modular multiplication module, the conversion coefficient of Montgomery modular multiplication can be obtained just by calling the Montgomery modular multiplication modules of different powers of the modulus N, i.e., calling the Montgomery modular multiplication function of the multi-power modulus N, such that conversion coefficient calculation through a large modular power multiplication mode can be avoided, the coefficient does not need to be calculated in advance, and the memory space can be saved. Moreover, the asymmetric key operation can also be finished on the basis of no complex large number library and may be used for detecting whether a large number is a necessary condition of a prime number and detecting the correctness of the Montgomery modular multiplication algorithm. In addition, if the calculated number is longer and longer, the advantages of this algorithm will be more significant in case of multiple prime number domains.

The above-mentioned embodiments are just preferred embodiments of the present invention, without limiting the present invention. All the modifications, equivalent replacements and improvements made within the spirit and principle of the present invention should fall into the protection scope of the present invention.

What is claimed is:

1. A Montgomery modular multiplication device, wherein said Montgomery modular multiplication device comprises:
    a first storage module configured to store two first preset parameters and a second preset parameter, wherein each of the first preset parameters is a constant 1, the second preset parameter is M, wherein
        M=W−4, and
        W=φ(N),
        wherein φ is an euler function and N is a modulus in Montgomery modular multiplication;
    a first Montgomery modular multiplication module configured to obtain a first operation result A according to the two first preset parameters and a Montgomery modular multiplication function;
    a power calculation module configured to obtain a second operation result B according to the first operation result A output by the first Montgomery modular multiplication module, one of the first preset parameters, the second preset parameter and a power calculation function, wherein the power calculation function is a power function for calculating a number $R^{-1}$, and R and $R^{-1}$ are reciprocal relative to the modulus N;
    the first Montgomery modular multiplication module is further configured to obtain a Montgomery modular multiplication conversion coefficient according to the first operation result the second operation result B and the Montgomery modular multiplication function;
    a second storage module configured to store the first operation result A, the Montgomery modular multiplication conversion coefficient, a first input parameter NA and a second input parameter NB; and
    a second Montgomery modular multiplication module configured to obtain a final modular multiplication result according to the first input parameter NA, the second input parameter NB, the Montgomery modular multiplication conversion coefficient and the Montgomery modular multiplication function;
    wherein the first storage module comprises a constant memory and a first register, wherein
        the constant memory is configured to store two constants 1 as the two first preset parameters; and
        the first register is connected with an input end of the power calculation module and is configured to store the second preset parameter,
    wherein the second storage module comprises a second register, a third register, a fourth register and a fifth register, wherein
        the second register is connected with the input end of the power calculation module and an output end of the first Montgomery modular multiplication module respectively and is configured to store the first operation result A;
        the third register is connected with the output end of the first Montgomery modular multiplication module and is configured to store the Montgomery modular multiplication conversion coefficient;
        the fourth register is connected with an input end of the second Montgomery modular multiplication module and is configured to store the first input parameter NA; and
        the fifth register is connected with the input end of the second Montgomery modular multiplication module and is configured to store the second input parameter NB.

2. The Montgomery modular multiplication device of claim 1, wherein the first Montgomery modular multiplication module comprises a first Montgomery modular multiplier, a first multiplexer, a second multiplexer and a first signal demultiplexer, wherein the first multiplexer is connected with the constant memory, the second register and the input end of the first Montgomery modular multiplier respectively, the second multiplexer is connected with the constant memory, an output end of the power calculation module and the input end of the first Montgomery modular multiplier respectively, and the first signal demultiplexer is connected with the second register, the third register and the output end of the first Montgomery modular multiplier respectively.

3. The Montgomery modular multiplication device of claim 1, wherein the power calculation module comprises an encoding unit, a sixth register, a seventh register, an eighth register, a ninth register, a first comparator, a first selector, a third multiplexer, a second Montgomery modular multiplier and a first subtractor, wherein,
    the encoding unit is configured to convert the second preset parameter into a code of a calculation process to obtain an operation designation number T and a bit length len thereof, wherein an input end of the encoding unit is connected with the first register;
    the sixth register is configured to store the operation designation number T;
    the seventh register is configured to store a value Q, wherein Q=len-1;
    the eighth register is configured to assign the first operation result A to an intermediate result S and store the intermediate result S, and output the second operation result B when a cyclic variable i is less than zero, wherein the second operation result B is equal to the intermediate result S;
    the ninth register is configured to initialize the cyclic variable i and assigning the value Q to the cyclic variable i;
    the first comparator is configured to judge whether the cyclic variable i is greater than or equal to zero, and send an operation state signal as an ending signal when the cyclic variable is less than zero;
    the first selector is configured to acquire a value of an operation designation number T [i] according to the cyclic variable i when the cyclic variable i is greater than or equal to zero, and output the value to the third multiplexer;

the third multiplexer is configured to connect the intermediate result S and the first preset parameters, output the intermediate result S and the first preset parameters to the second Montgomery modular multiplier when the value of the operation designation number T [i] does not satisfy logic truth, and output the two intermediate results S when the value of the operation designation number T [i] satisfies logic truth;

the second Montgomery modular multiplier is configured to update the intermediate result S according to the intermediate result S and the first preset parameters, or update the intermediate result S according to the two intermediate results S, wherein an input end of the second Montgomery modular multiplier is connected with the eighth register and the third multiplexer respectively, and an output end of the second Montgomery modular multiplier is connected with the eighth register; and the first subtractor is configured to auto-decrease a constant 1 from the value of the cyclic variable i after the intermediate result S is updated, and write a result of auto-decreasing the constant 1 from the value of the cyclic variable i into the ninth register, wherein the subtractor is connected with the ninth register, and the ninth register is connected with the first comparator.

4. An embedded security chip, wherein said embedded security chip comprises the Montgomery modular multiplication device of claim 1.

5. The Montgomery modular multiplication device of claim 3, wherein the encoding unit comprises a tenth register, an eleventh register, a twelfth register, a thirteenth register, a fourteenth register, a second comparator, a third comparator, a fourth comparator, a fifth comparator, a logic controller, a fourth multiplexer, a first adder, a second adder, a third adder, a fourth adder, a second selector, a second subtractor and a fifth multiplexer, wherein, the tenth register is configured to store a first variable ZeroCounter and initialize the first variable ZeroCounter to zero according to an initializing signal;

the eleventh register is configured to store a second variable OneCounter and initialize the second variable OneCounter to zero according to an initializing signal;

the twelfth register is configured to store a cyclic variable i and initialize the cyclic variable i to zero according to an initializing signal;

the thirteenth register is configured to store a third variable Out_i and initialize the third variable Out_i to zero according to an initializing signal;

the fourteenth register is configured to store a value of E_Bitslen, wherein the E_Bitslen is a bit length of the second preset parameter;

the second comparator is configured to judge whether the cyclic variable i is less than or equal to E_Bitslen, and output a second judging result to the logic controller;

the third comparator is configured to judge whether the first variable ZeroCounter is equal to zero, and output a third judging result to the logic controller;

the fourth comparator is configured to judge whether the second variable OneCounter is equal to zero and output a fourth judging result to the logic controller;

the second selector is configured to acquire a value of E[i] according to the cyclic variable i and output the value of E[i] to the logic controller;

the logic controller is configured to output the first control signal when the cyclic variable i is greater than E_Bitslen, and output at least one of a second group of control signals, a third group of control signals, a fourth group of control signals, a fifth group of control signals and a sixth control signal according to the value of E[i], the third judging result and the fourth judging result, wherein the second group of control signals, the third group of control signals, the fourth group of control signals and the fifth group of control signals are all include the sixth control signal;

the fourth multiplexer is configured to connect the constant 1, the tenth register and the eleventh register respectively, output the constant 1 and the value of ZeroCounter when receiving the third group of control signals and output the value of OneCounter when receiving the fifth group of control signals;

the first adder is configured to auto-add 1 to the third variable Out_i, calculate the third variable Out_i=Out_i+ZeroCounter, and output a calculation result to the thirteenth register;

the second adder is configured to auto-add 1 to the second variable OneCounter when receiving the second group of control signals;

the third adder is configured to auto-add 1 to the cyclic variable i when receiving the sixth control signal;

the second comparator is further configured to judge whether the cyclic variable i is less than or equal to E_Bitslen when the cyclic variable is auto-added by 1, and output a second judging result to the logic controller;

the sixth register is further configured to assign zero to an operation designation number T[Out_i] and assign 1 to an operation designation number T [Out_i:Out_i+ZeroCounter−1] when receiving the third group of control signals, and assign 1 to an operation designation number T [Out_i:Out_i+ZeroCounter−1] when receiving the fifth group of control signals;

the eleventh register is further configured to assign 0 to the second variable OneCounter when receiving the fifth group of control signals;

the tenth register is further configured to assign 1 to the first variable ZeroCounter when receiving the fifth group of control signals, and assign 1 to the first variable ZeroCounter when receiving the third group of control signals;

the fourth adder is configured to auto-add 1 to the first variable ZeroCounter when receiving the fourth group of control signals;

the fifth comparator is configured to judge whether the third variable Out_i is greater than zero when receiving the first control signal;

the second subtractor is configured to auto-decrease 1 from the third variable Out_i when the third variable Out_i is greater than zero; and the fifth multiplexer is configured to connect the fifth comparator, the second subtractor and the seventh register respectively, output a result of auto-decreasing 1 from the third variable Out_i to the seventh register when the third variable Out_i is greater than zero, and output the third variable Out_i to the seventh register when the third variable Out_i is less than or equal to zero.

6. The Montgomery modular multiplication device of claim 3, wherein the second Montgomery modular multiplication module comprises a third Montgomery modular multiplier, a sixth multiplexer, a seventh multiplexer, a third signal demultiplexer, a twentieth register and a twenty-first register, wherein the sixth multiplexer is connected with the fourth register and the twentieth register, and the seventh multiplexer is connected with the third register and the fifth register respectively, wherein, an input end of the third Montgomery modular multiplier is connected with the sixth multiplexer and the seventh multiplexer respectively, an output end of the third Montgomery modular multiplier is connected with the third signal demultiplexer, and the third Montgomery modular multiplier is configured to obtain a first modular multiplication result NAR according to the first input parameter NA and the Montgomery modular multiplication conversion coefficient;

the twentieth is connected with the third signal demultiplexer and the sixth multiplexer respectively and is configured to store the first modular multiplication result NAR;

the third Montgomery modular multiplier is further configured to obtain a final power multiplication result according to the second input parameter NB and the first modular multiplication result NAR; and the twenty-first register is connected with the third signal demultiplexer and is configured to store the final modular multiplication result.

7. The Montgomery modular multiplication device of claim 3, wherein the second Montgomery modular multiplication module comprises a fourth Montgomery modular multiplier, an eighth multiplexer, a ninth multiplexer, a fourth signal demultiplexer, a twenty-second register and a twenty-third register, wherein, the eighth multiplexer is connected with the fifth register and the twenty-second register, and the ninth multiplexer is connected with the fourth register and the third register respectively;

an input end of the fourth Montgomery modular multiplier is connected with the eighth multiplexer and the ninth multiplexer respectively, an output end of the fourth Montgomery modular multiplier is connected with the fourth demultiplexer, and the fourth Montgomery modular multiplier is configured to obtain a second modular multiplication result NBR according to the second input parameter NB and the Montgomery modular multiplication conversion coefficient;

the twenty-second register is connected with the fourth signal demultiplexer and the eighth multiplexer respectively and is configured to store the second modular multiplication result NBR;

the fourth Montgomery modular multiplier is further configured to obtain the final modular multiplication result according to the first input parameter NA and the second modular multiplication result NBR; and the twenty-third register is connected with the fourth signal demultiplexer and is configured to store the final module multiplication result.

8. The Montgomery modular multiplication device of claim 3, wherein the second Montgomery modular multiplication module comprises a fifth Montgomery modular multiplier, a tenth multiplexer, an eleventh multiplexer, a fifth signal demultiplexer, a twenty-fourth register and a twenty-fifth register, wherein, the tenth multiplexer is connected with the fourth register, and the eleventh multiplexer is connected with the third register and the fifth register respectively;

an input end of the fifth Montgomery modular multiplier is connected with the tenth multiplexer and the eleventh multiplexer respectively, an output end of the fifth Montgomery modular multiplier is connected with the fifth signal demultiplexer, and the fifth Montgomery modular multiplier is configured to obtain a third modular multiplication result NARBr according to the first input parameter NA and the second input parameter NB;

the twenty-fifth register is connected with the fifth signal demultiplexer and is configured to store the third modular multiplication result NANBr;

the fifth Montgomery modular multiplier is further configured to obtain a final modular multiplication result according to the Montgomery modular multiplication conversion coefficient and the third modular multiplication result NANBr; and the twenty-fourth register is connected with the fifth signal demultiplexer and the tenth multiplexer respectively and is configured to store the final modular multiplication result.

* * * * *